(12) United States Patent
Su

(10) Patent No.: US 6,365,074 B1
(45) Date of Patent: Apr. 2, 2002

(54) METHOD OF INVENTORY CONTROL FOR MOLDED LENSES

(75) Inventor: Kai C. Su, Alpharetta, GA (US)

(73) Assignee: Technology Resource International Corporation, Alpharetta, GA (US)

( * ) Notice: Subject to any disclaimer, the term of this patent is extended or adjusted under 35 U.S.C. 154(b) by 0 days.

(21) Appl. No.: 09/409,318

(22) Filed: Sep. 30, 1999

Related U.S. Application Data

(63) Continuation-in-part of application No. 09/025,903, filed on Feb. 19, 1998, now Pat. No. 6,068,464.

(51) Int. Cl.⁷ .............................................. B29D 11/00
(52) U.S. Cl. .................. 264/1.7; 264/2.5; 264/132; 425/542; 425/808
(58) Field of Search ................. 264/1.1, 1.7, 2.5, 264/132, 2.6; 425/808, 542, 447, 449

(56) References Cited

U.S. PATENT DOCUMENTS

| | | | |
|---|---|---|---|
| 3,497,576 A | 2/1970 | Dvorin | 264/1 |
| 4,194,814 A | 3/1980 | Fischer et al. | 351/160 R |
| 4,525,044 A * | 6/1985 | Bauman | |
| 5,034,166 A | 7/1991 | Rawlings et al. | 264/1.7 |
| 5,307,740 A | 5/1994 | Yamamoto et al. | 101/44 |
| 5,580,498 A | 12/1996 | Sugiyama et al. | 264/1.7 |
| 5,641,437 A | 6/1997 | Williams et al. | 264/2.5 |

* cited by examiner

Primary Examiner—Mathieu D. Vargot
(74) Attorney, Agent, or Firm—Needle & Rosenberg, P.C.

(57) ABSTRACT

A method for labeling an identification mark on a lens for inventory control. The identification mark is placed onto the facing inside surface of a mold by an ink jet printer and is remained there when the lens-forming liquid is cured. Once the lens is formed, but before the demolding, the identification mark is transferred from the mold to the lens. The identification mark contains information identifying the lens' properties such as the power of the lens and can be used for inventory control.

19 Claims, 3 Drawing Sheets

METHOD OF INVENTORY CONTROL FOR MOLDED LENSES

This application is a continuation-in-part of Ser. No. 09/025,903 filed on Feb. 19, 1998, now U.S. Pat. No. 6,068,464, which is hereby incorporated herein by reference.

BACKGROUND OF THE INVENTION

1. Field of the Invention

The present invention comprises a method for labeling an identification mark on a plastic spectacle lens, and more particularly, the present invention relates to a method of using an ink jet printer or a similar printing device to print an identification mark onto a mold used to form a lens and subsequently transferring the identification mark from the mold directly to the lens when the lens is formed.

2. Background Art

The ophthalmic lenses for glasses are made of a transparent material, usually glass or plastic, and are of a size and shape to produce desired effects, namely, focusing the light for the person's eye to see clearly. Such glasses or spectacles must correspond to a person's prescription as well as to the person's morphological and psychological characteristics. In other words, lenses used in glasses have certain optical properties corresponding to a set of specifications as described, say, in a prescription.

The lenses use a well-defined geometrical configuration which determines the their optical properties. The shape of each lens is characterized by three attributes: (1) the curvature of its two surfaces; (2) the thickness at its center and edges; and (3) its diameter. The two surfaces of a lens can use various geometric configurations, including the following shapes: spherical; cylindrical; toric; plano; aspheric (usually elliptical); and progressive. For example, the surface of a lens can have a constant radius along its different axes so that the surface is symmetrical, which is known as a spherical surface. The spherical lens surface mirrors the shape of a portion of a sphere in which all meridians have the same radius of curvature. The spherical surface may be either convex or concave.

Alternatively, the surface of the lens can have two axes, each having a different radius of curvature, so that the surface of the lens is asymmetrical. An astigmatic surface is an example of such an asymmetrical surface and is characterized by its two principal meridians having a different radius of curvature from each other. The meridian having the greatest radius of curvature is called the "axis," and the other meridian having the smaller radius is called the "perpendicular axis." Astigmatic lens surfaces predominantly include a cylindrical surface and a toric surface. A plano surface and aspheric surface are examples of other lens surfaces used in the art.

For the cylindrical surface, the principal meridians along the axis have an infinite radius of curvature, e.g., flat or straight, and the perpendicular axis has a radius of curvature which is the same as the circular radius of a cylinder. Thus, a concave cylindrical surface is shaped to complementarily receive a cylinder on the surface and a convex surface resembles the exterior surface of such a cylinder.

The toric surface resembles the lateral surface of a torus, e.g., shaped as the inner tube of a tire. Thus, a torus surface is similar to a cylindrical surface, but the longitudinal axis curves instead of being straight as for a cylindrical surface. The perpendicular axis or meridian on the toric surface has a radius of curvature smaller than the radius of the axis. As with a spherical and a cylindrical surface, a toric surfaces can be convex by having the shape of the exterior surface of a torus or, alternatively, may be concave by having the shape of the inner surface of a torus.

An astigmatic surface is used for a person with an ocular astigmatism, in which the cornea is elliptical instead of round. The orientation of the elongated portion of an astigmatic cornea varies from person to person. For example, one person may have an axis at five degrees, another at thirty degrees, and another at yet a different orientation. The axis of the surface of the lens must be oriented to align with the orientation of the elongated portion of the cornea.

Different lens surfaces can be used in combination. Often, the front surface of a lens is spherical and the back surface is spherical, cylindrical, or toric. The front surface can alternatively be a plano surface. The optimum combination of surfaces in a lens is determined by the optical properties, the proposed use, and the appearance of the lens.

In addition to shape, thickness is also an important characteristic of a lens. The glass or plastic used to form the lens is a factor in establishing the thickness. Many lenses today are made from plastic because of its light weight, density, refractive index, and impact resistance. Examples of plastics used for lenses include methylmethacrylate (a thermoplastic resin, which is better known by its trademark "Plexiglas"® or "Perspex"®) and diallyl glycol carbonate, which is also known as CR39.

CR39 is one of popular lens-forming materials used today, in part, because all lens types used in ophthalmic optics can be made from it by molding. CR424 is another lens-forming material used today. CR39 is a petroleum derivative of the polyester group, a family of polymerisable thermosetting resins. In production, a monomer is first obtained from CR39. The monomer, which is a limpid liquid with the viscosity of glycerine oil, remains in a liquid state in cold storage, but hardens after several months at room temperature. To form a lens, the liquid monomer is placed and contained in a cavity or volume jointly defined by two molds and a closure member such as a gasket. Once the monomer is in the volume, the monomer is cured to form a hardened polymeric lens taking the shape of the molds.

The glass molds used to form polymeric lenses are important in lens manufacturing by molding. Not only do the molds form the correct shape to the lens according to the optical characteristics required, but the surface qualities of the finished lens depends on the accuracy of the molds since the lens surfaces are a precise reproduction of the inner mold surfaces. Accordingly, the mold surfaces are prepared with extreme precision and, after manufacture, are heat toughened to withstand the strain of the polymerization process.

The relative axial positions of the molds are also important in lens molding because they decide the thickness of a lens. As people skilled in the art know, different relative axial positions of the molds producing lenses with varying powers. The molds would be set farther apart to form a lens of a greater power compared to form a lower power lens. Thus, for a specific power lens, molds must be set at a predetermined axial separation.

An add power front mold, which forms a bifocal or trifocal portion to the lens, can also be used in forming lenses. The add power mold includes a segment curve, which is a concave depression cut into the concave half of the mold, to form the add power segment on the front surface of the lens. This segment curve produces a convex surface for the distance portion, together with a steeper convex surface for the reading add power segment.

In sum, each optical lens has a unique set of specifications identifying its optical properties. Because a lens formed by molding takes the shape of the molds, the specifications of the lens are determined by the corresponding specifications of the molds and the relative positions of the molds.

While some lenses are still made in a traditional way, most lenses today are made by molding for good reasons. One is that molding produces better lenses because the molds can be prepared with great precision and plastic such as CR39 or CR424 conforms to the shape of the molds easily. Moreover, molds are reusable and therefore molding reduces the production cost. Furthermore, molding allows the plastic lens forming process to be easily automated and thus further increases productivity at reduced production cost.

In an automated lens-forming manufacturing process, more than one manufacturing line can be utilized to produce lenses in quantity. Often one manufacturing line may produce lenses with a set of specifications. Other lines may produce lenses with one set of specifications. Because each lens has its own set of specifications, it must be properly labeled with corresponding specifications before it is delivered to customers.

However, tracking the specifications of an individual plastic spectacle lens after its manufacture and verifying its identity is troublesome because lenses are transparent. They look alike even if they are not the same. Currently, an additional inspection step must be used in the lens manufacturing process to measure and identify a lens once it is produced. Moreover, depending on when the lens is labeled on the manufacturing line, mix-ups may occur. Because lenses made at a production site are manufactured from the same plastic, and often from the same molds, the likelihood of mix-ups is even greater today. To minimize mix-ups, it may be desirable, or even necessary, to verify the lens identity before labeling. Thus, additional time and effort have to be spent for proper inventory control. This prolongs the manufacturing time and increases the production cost. The problem has existed for years but it is still left unaddressed.

SUMMARY OF THE INVENTION

The present invention attempts to solve the inventory control problem of molded lenses by providing a method for labeling an identification mark on a molded plastic optical lens. The identification mark includes information identifying the lens' optical properties including at least the power of the lens. The identification mark may be visible and readable to human eyes. Preferably, the identification mark is machine readable. The lens is labeled with the identification mark by applying the identification mark in ink to one of the molds used to form the lens. The identification mark is transferred from the mold to the lens upon curing and removal from the mold.

In this regard, the method of the present invention in one embodiment is practiced by placing an identification mark in ink on the facing inside surface of a mold. The mold is then filled with a lens-forming liquid. The lens-forming liquid is cured or hardened to form the lens while the identification mark is remained on the mold. The identification mark is transferred from the mold to a portion of the surfaces of the formed lens by virtue of direct contact between the mold and the surfaces of the lens because the ink has stronger affinity to the lens material than to the mold. When the lens is removed from the mold, the identification mark stays with that portion of the surfaces of the lens and can be used to identify the lens for inventory control purpose.

Thus, the identification mark of the lens is given to and labeled on the lens when it is produced, or "born." Consequently, the present invention may minimize the likelihood of potential mix-ups. Moreover, the additional inspection procedure is no longer needed to identify the characteristics of the lens. A reading of the identification mark can provide information identifying the lens' properties including the power of the lens.

Because a molded lens is formed normally by coordinating a first mold and a second mold whose facing inside surfaces are a negative image of the surfaces of the lens when the molds are positioned at a proper distance and rotational orientation to each other, either mold can be chosen as a candidate to receive the identification mark. The present invention can be practiced by placing the identification mark on the facing inside surface of the first mold or the second mold or both. In one embodiment, the first mold is chosen to receive the identification mark. The first and second molds, cooperating with a closure member to form a molding cavity, are then filled with a lens-forming liquid such as a CR424 monomer. The lens-forming liquid is cured or hardened to form the lens while the identification mark remains on the first mold. The identification mark is then transferred from the first mold to a portion of the surfaces of the lens and remains with that portion of the surfaces of the lens when the lens is removed from the molds. The first mold can be a front mold or a back mold, as known to the people skilled in the art.

In one embodiment, the present invention uses an ink jet printer to place the identification mark onto the facing inside surface of a mold. The ink composition is selected to allow the identification mark to remain on the mold when the lens-forming liquid is filled and then cured. If the mold is made from glass and the lens-forming material is polymer, the ink is selected to have stronger affinity to the polymer lensforming material than to the glass mold. Once the lens is formed, but before demolding, the identification mark is transferred directly from the mold to a portion of the surfaces of the lens. The transferring is achieved because the ink has stronger affinity to the lens. Thus, the transferring is accomplished automatically. The identification mark contains information identifying the lens' properties such as the power of the lens. Thus, the specifications of the lens can be easily verified from the identification mark on the lens. Chances for error in labeling can be minimized because the identification mark is transferred to the lens directly from the mold that determines the lens' properties.

Because the specifications of a molded lens depend on the physical properties of molds from which the lens is formed, each mold can be premeasured and marked with an indication such as a mark in the form of a bar code that represents the measurements. This bar code can be etched onto the back surface of the mold. The back surface is the surface opposing the facing inside surface of the mold where the lens-forming liquid is to occupy in filling. In use, an operator, being a real person or an automation means, can just scan the bar code to get the properties of the mold without repeating the measurements. The bar code can be read by a machine such as a scanner and then placed in ink on the facing inside surface of the mold so that the bar code transfers subsequently onto the cured lens. The bar code on the back surface of the mold could then be read again and reprinted on the facing inside surface of the mold before the mold is used to make another lens. This process can be repeated and thus is suitable for use in automated lens-forming manufacturing process.

When the identification mark is printed onto the mold, the location of the identification mark on the facing inside surface of the mold may be anywhere within that surface. But preferably, the identification mark is located at a spot so that when the identification mark is transferred to the lens it will be positioned at a location that will be cut away when the lens is finally used in glasses. Normally, that location is around the periphery of the facing inside surface. Alternatively, the identification mark can be removed from the lens by polishing near or at the end of the manufacturing process.

Furthermore, the present invention utilizes a computer system to coordinate the labeling process and thus has the capacity to put an identification mark on the mold with updated information. As known to the people skilled in the art, normally two molds are required to form a lens. Thus, even if a mold is measured beforehand and its physical properties such as its height, radius and other characteristics are ascertained and contained in the identification mark, such as a bar code, the thickness of the lens to be formed can only be ascertained when the two molds are positioned at a proper axial separation. Once the molds are positioned properly, the computer system would obtain the corresponding data for the thickness of the lens and group it together with the information already contained in the bar code into an updated identification mark. The updated identification mark then is placed onto the facing inside surface of the mold. The updated identification mark can also be in a form of bar code.

Other objects, advantages and uses for the present invention will be more clearly understood by reference to the remainder of this document.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

Figure 1:
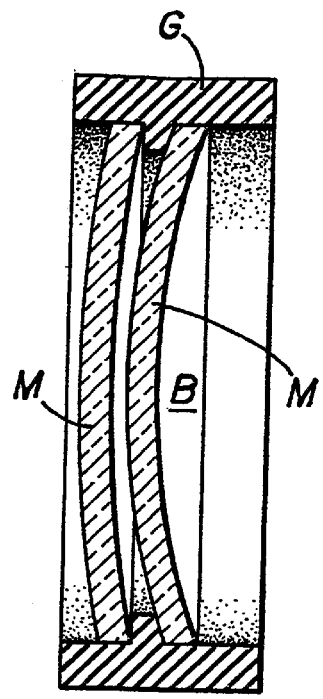
FIG. 1 is a cross-sectional view of a mold assembly using a T-gasket as closure member.
Figure 2:
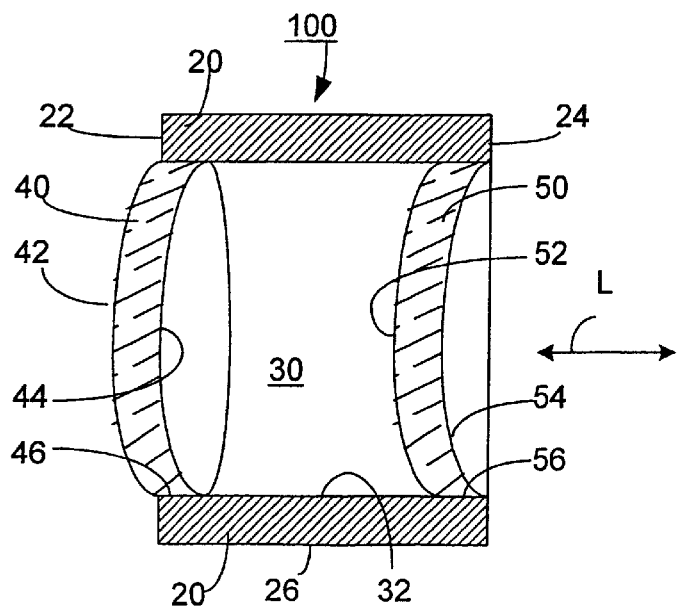
FIG. 2 is a cross-sectional of a mold assembly using a sleeve as closure member.

Referring now to FIGS. 1 and 2, molds M or front mold 40 and back mold 50 cooperate with a closure member to form a molding cavity for molding lenses of varying powers. Closure member could be a prior art T-gasket 10 as shown in FIG. 1, or a sleeve 20 as shown in FIG. 2. Other types of closure member known to the people skilled in the art may also be used. For the purpose of the present description of the invention, reference will be made to the configuration shown in FIG. 2, but it will be understood by one of ordinary skill in the art that the principles described herein will be equally applicable to other configurations as well, including that shown in FIG. 1.

Referring to FIG. 2, the sleeve 20 has a first end 22, an opposed second end 24, a body portion joining the first end 22 to the second end 24, and a longitudinal, or axially, extending axis L. The sleeve 20 has an outer surface 26 and defines a bore 30 extending axially through the sleeve 20 between its opposed ends 22, 24. The bore 30 forms an interior surface 32 that circumscribes the longitudinal axis L of the sleeve 20.

The bore 30 of the sleeve 20 receives both a front mold 40 and a back mold 50 therein. As shown in FIG. 2, the front mold 40 has a forward surface 42, an opposed back surface 44, and an edge 46 circumscribing it. The edge 46 and the interior surface 32 of the sleeve 20 are complementary to each other in size to form a substantially leak-proof seal therebetween.

The back mold 50 likewise has a forward surface 52, an opposed back surface 54, and an edge 56 circumscribing it. The edge 56 and the interior surface 32 of the sleeve 20 are also complementary to each other in size to form a substantially leak-proof seal therebetween. Since the molds 40, 50 preferably are circular and have a substantially identical diameter, the preferred embodiment of the sleeve 20 is also circular in cross-section as shown in FIG. 2. Indeed, the preferred embodiment of the sleeve 20 is a tubular structure, so that the bore 30 extends through the opposing ends 22, 24 with a constant diameter. When the front mold 40 and the back mold 50 are both positioned within the bore 30 of the sleeve 20 as shown in FIG. 2, the combination of components is called a lens-forming assembly 100, a lens-forming structure, or a lens casting cell.

The front mold 40 and the back mold 50 both have a set of specifications to identify their individual properties, respectively. In order to produce a particular lens, the front mold 40 and the back mold 50 must work in a selective pair. Pairing a front mold and a back mold requires matching their specifications to the properties of the lens to be formed. According to an embodiment of the present invention, the back mold 50 is premeasured so that its set of specification identifying its properties is ascertained. An indication 60, shown in the form of a bar code in FIG. 4, containing information that represents the measurement, is marked on the back surface 54. This bar code 60 can be etched onto the back surface 54, or can be printed there. Bar code 60 can be read by a scanner (not shown). Optional holder portion 55 may be used to manipulate the back mold 50. Each time when the properties of the back mold 50 are needed, they can be obtained simply by scanning the bar code 60. Similarly, a premeasurement could also be done in association with the front mold 40 and a corresponding indication mark could be placed on the forward surface 42 of the front mold 40. In another embodiment of the invention, because the front mold 40 and the back mold 50 must work in a selective pair to produce a lens, their respective properties can be incorporated into one indication mark, which can then be placed on either the front mold 40 or the back mold 50.

Moreover, the properties of the lens to be formed by the front mold 40 and 50 are determined by the front mold 40 and back mold 50. Thus, once the properties of the front mold 40 and back mold 50 are ascertained, the optical properties of the lens to be formed by the molds such as the power of the lens are determined as well, which can be incorporated into the identification mark 60.

Figure 3:
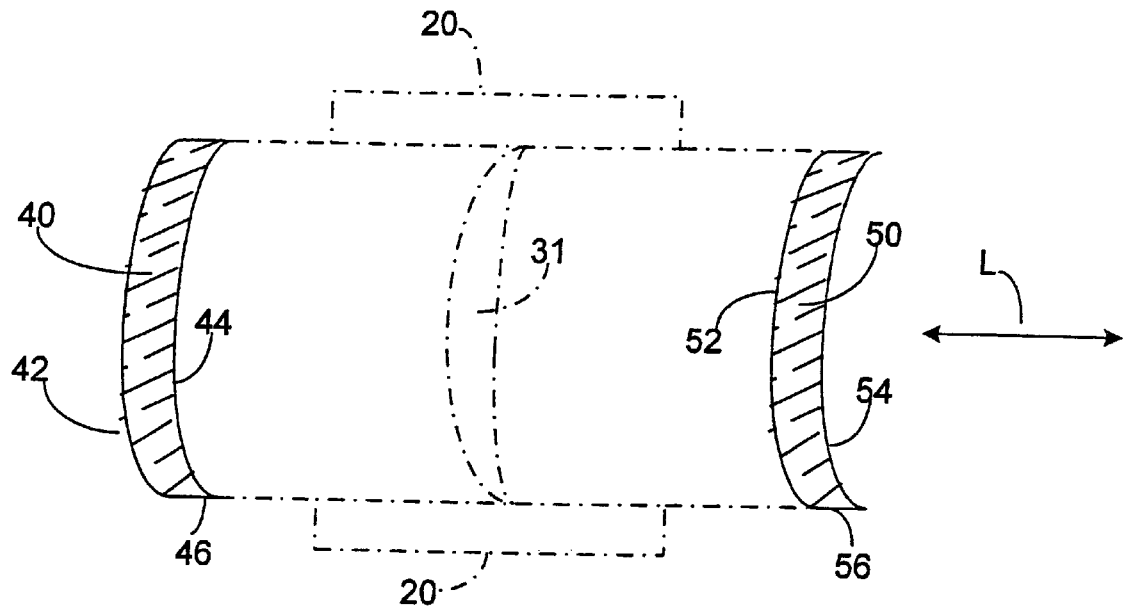
FIG. 3 is an exploded cross-sectional view of the mold assembly shown in FIG. 2.

A molding cavity is formed by the back surface 44 of the front mold 40, the forward surface 52 of the back mold 50 and at least a portion of the interior surface 32 of the sleeve 20 when the molds 40, 50 are closed by the sleeve 20. That is, the molds 40, 50 are positioned in a spaced-apart relationship within the bore 30 so that a cavity 31 is formed therebetween. Cavity 31 preferably has appropriate dimensions to form a desired lens when a lens-forming liquid is injected into the cavity 31 and cured therein. The cavity 31 is also shown in phantom in FIG. 3. The forward surface 52 of the back mold 50 and the back surface 44 of the front mold 40 are often referred as the casting surfaces in the art.

The lens-forming liquid is preferably a UV curable monomer such as CR424, which is manufactured by P.P.G. located at Monroeville, Pa. As one skilled in the art will appreciate, other lens-forming materials known in the art can be used with the present invention. The molds 40, 50 are preferably made from glass.

The front mold 40 or the back mold 50 is axially movable within the bore 30 relative to the other mold to a desired one of a plurality of axial separation distances between the molds. Alternatively, both can move axially. The volume of the cavity 31 is different for each axial separation distance and, accordingly, the dimensions of the lens formed within the cavity 31 are also different for each axial separation distance. Therefore, the dimensions of the lens to be formed are determined not only by the shape of the front mold 40 and back mold 50 but also by the relative position between them. Thus, the information contained in the bar code 60 may not give a complete set of specifications about the lens. In one embodiment of the present invention, a computer system (not shown) is utilized to incorporate the data representing the thickness of the lens with the information contained in the bar code 60 into an updated set of specifications about the lens.

In most cases, especially in an automated lens-forming manufacturing line, the axial separation of the two molds is predetermined. Thus, this automated manufacturing line produces substantially identical lenses. (The inventory problem still exists because other manufacturing lines may produce different lenses.) Because the axial separation of the two molds is known and same for all the lenses to be formed by this manufacturing line, it can be incorporated into this bar code 60 beforehand, which now would contain a complete set of specifications about the lens.

Figure 5:
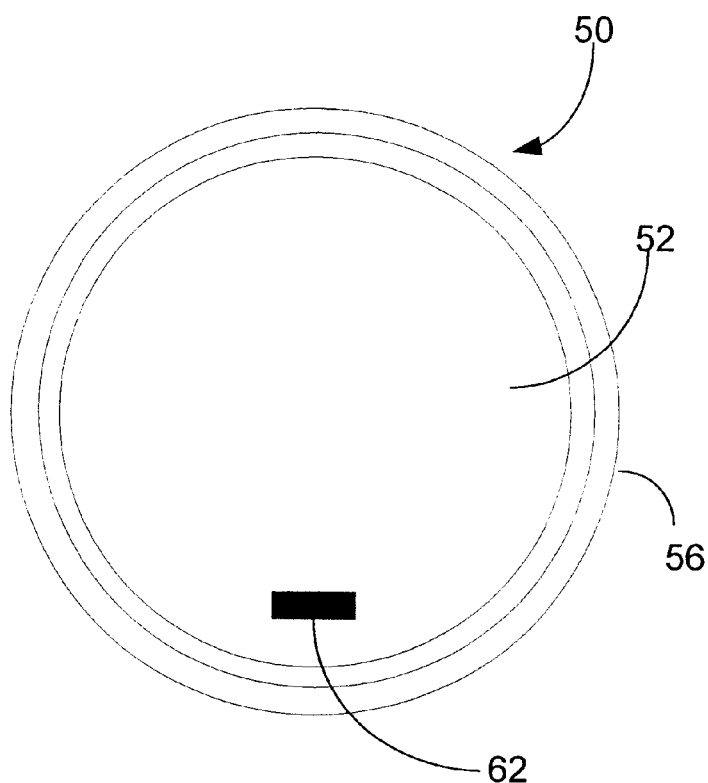
FIG. 5 is a plan view of the mold shown in FIG. 4, which has a mark applied to its casting surface.

Once a complete set of specifications of the lens is ascertained, according to one embodiment of the invention, a corresponding identification mark 62 is placed onto the forward surface 52 of the back mold 50 prior to the filling of the lens-forming liquid as shown in FIG. 5. To do so, an ink jet printer (not shown) is utilized to directly print the identification mark 62 onto the forward surface 52. While many ink jet printers or similar printing device may be used, this embodiment uses a Hewlett-Packard Jet Printer. The ink is selected to allow the identification mark 62 to remain on the forward surface 52 long enough at least to survive the curing process. Moreover, the ink is selected so as to have stronger affinity to the polymeric lens formed from the lens-forming liquid than to the glass molds. Again, a wide range of inks is available. In one embodiment of the invention, an ink selected from a group of inks including Domino Printing Ink BK2301 and Domino Makeup 2321, both available in the market, is used. Similarly, the identification mark 62 can be placed onto the backward surface 44 the front mold 40.

Figure 4:
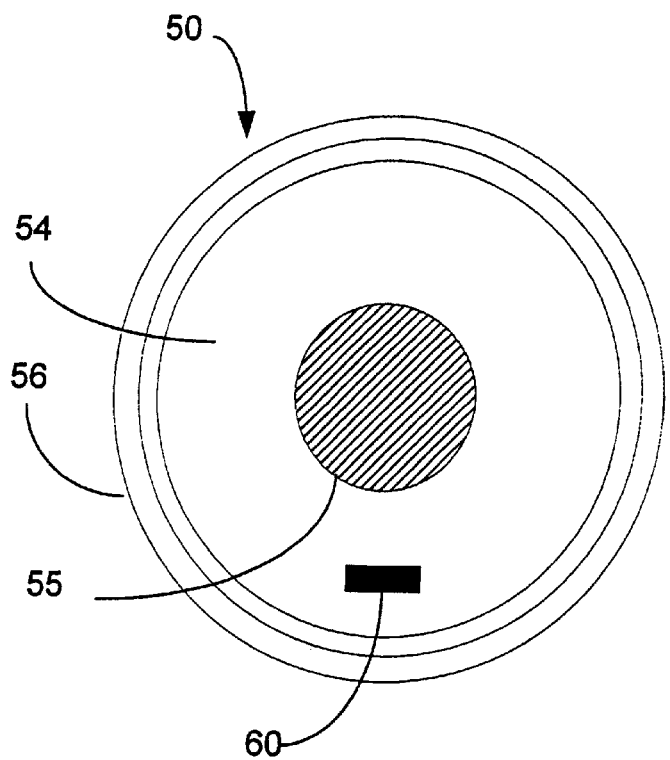
FIG. 4 is a plan view of a mold used in the present invention, which has a mark applied to its back surface, a surface opposing its casting surface.
Figure 6:
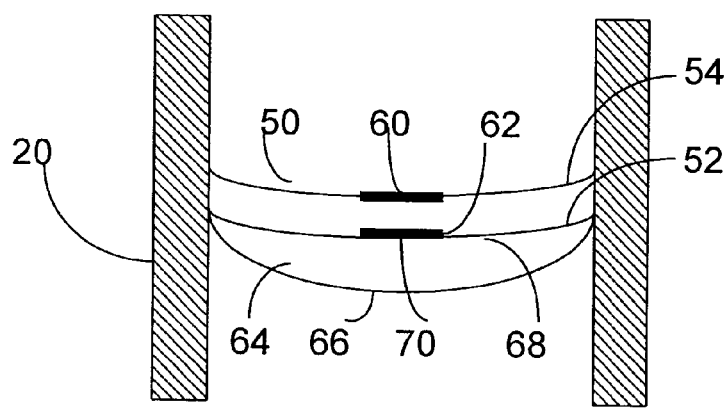
FIG. 6 is a partial cross-sectional side view of a molded lens with one of the molds.

The identification mark 62 can take different forms such as bar code, digits, graphics, letters or any combination. The identification mark 62 can be machine-readable or human-readable. Preferably, bar code is used in the embodiment of the present invention shown in FIGS. 4–6. Bar code may include a machine-readable part and a human-readable part. Moreover, the identification mark 62 can be visible, as shown in FIGS. 4–6 where ink is used, or invisible. Furthermore, the identification mark 62 may include more, same or less information then the identification mark 60.

The lens-forming liquid is introduced into the cavity 31 preferably through injecting method known in the art. The liquid monomer is injected into the cavity 31 by a filling needle (not shown). In operation, the filling needle pierces through the sleeve 20 into the cavity 31 or penetrates through an existing opening (not shown) and hence establishes a fluid communication channel between the cavity 31 and an outside reservoir of the liquid monomer (not shown), so that a proper amount of the liquid monomer is filled.

Once the cavity 31 is filled, the lens-forming liquid is cured or hardened. The molds 40, 50 may move along the longitudinal axis L to compensate for any shrinkage which may occur. As one skilled in the art will appreciate, curing can be accomplished in a number of ways. For example, the curing method of the present invention involves exposing the fluid lens-forming material to an ultraviolet ("UV") light for a desired time. Alternatively, after exposing the fluid lens-forming material to UV light, the fluid lens-forming material is then heated for a predetermined time, such as in an infrared ("IR") oven. The second heating step would solidify the liquid lens-forming material to form the hardened lens if not sufficiently cured in the UV step. Eventually, a lens 64 is formed.

As shown in FIG. 6, the lens 64 has a forward surface 66 and a backward surface 68. During the curing process, the identification mark 62 is remained on the forward surface 52 of the back mold 50 (or the backward surface 44 of the front mold 40, 20 alternatively). The backward surface 68 is hardened gradually from a liquid state to a solid state, formed as an image of the forward surface 52 of the back mold 50. Once the lens 64 is formed, the backward surface 68 of the lens 64 and the forward surface 52 of the back mold 50 match to each other and are in direct contact. Since the ink has stronger affinity to the formed lens 64, the identification mark 62 is transferred from the forward surface 52 of the back mold 50 to a portion of the backward surface 68 of the lens 64. Because what is transferred actually is the image 70 of the identification mark 62, care can be taken beforehand so that the image 70 is readily readable, either by a machine or a human for inventory control.

The location of the image 70 can be anywhere on the backward surface 68 of the lens 64. However, because the lens 64 is used as an optical instrument, preferably the image 70 is located away from the center of the lens 64 and the forward surface 66. The image 70 normally is located around the periphery of the lens 64. In one embodiment of the present invention, the image 70 is located at a portion that would be cut away when finally used in glasses. Alternatively, the image 70 can be removed by polishing or similar technics at the end of manufacturing process.

After the lens-forming liquid is cured, the solidified lens 64 must be separated from the sleeve 20 and molds 40, 50. Since the sleeve 20 is flexible, the two molds 40, 50 and the lens 64 sandwiched therebetween can easily be slid out of the sleeve 20. Alternatively, the sleeve 20 can be just simply torn off.

Now the ink jet printer (not shown) can again imprint the identification mark on the forward surface 52 of the back mold 50 before the back mold 50 is used to make another lens. The above process is then repeated. This way, every lens produced will have an identification mark with it. Proper inventory control can be achieved by checking the identification mark.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

For example, the invention has been described with reference to use a sleeve as a closure member to cooperate with two molds to form a molding cavity. The sleeve, however, may be replaced by a T-gasket or other types of gaskets. Furthermore, each mold may maintain an identification mark and transfer it to the lens, respectively.

What is claimed is:

1. A method for identifying a lens with a bar code, wherein the lens is formed by molding using a first mold and a second mold whose facing inside surfaces are a negative image of the surfaces of the lens when the molds are positioned at a proper distance and rotational orientation to each other, and the bar code contains information identifying the lens' properties that are determined by the molds including the power of the lens, comprising the steps of:
   a. placing an image of the bar code on the facing inside surface of the first mold;
   b. filling the molds with a lens-forming liquid;
   c. curing the lens-forming liquid to form the lens; and
   d. transferring the image of the bar code directly from the first mold to a portion of the surfaces of the lens such that the bar code appears on and remains with that portion of the surfaces of the lens when the lens is removed from the molds.

2. The method of claim 1, the step of placing an image of the bar code further comprises the step of printing the image of the bar code on the facing inside surface of the first mold.

3. The method of claim 2, wherein the image of the bar code is printed by an ink jet printer.

4. The method of claim 3, wherein at least till the lens is cured the image of the bar code is durable enough to remain on the facing inside surface of the first mold.

5. The method of claim 1, further comprising the step of measuring the molds to gather the information identifying the lens' properties that are determined by the molds.

6. The method of claim 5, further comprising the step of etching the back surface of the first mold a bar code incorporating the information.

7. The method of claim 6, further comprising the step of reading from the bar code of the back surface of the first mold the information to generate the image of the bar code on the facing inside surface of the first mold.

8. The method of claim 7, wherein the step of reading the information from the bar code of the back surface of the first mold is performed by a scanner.

9. A method of identifying a lens for inventory control, comprising:

a. Measuring at least one mold to obtain a set of specification identifying its properties;
   b. Placing a first bar code containing information representing the set of specification identifying its properties on the back surface of a mold;
   c. Placing an image of a second bar code containing the information at least representing the first bar code on the facing inside surface of the mold;
   d. Filling the mold with a lens-forming liquid;
   e. Curing the lens-forming liquid to form the lens; and
   f. Transferring the image of the second bar code from the mold to a portion of the surfaces of the lens by virtue of direct contact between the mold and the portion of the surfaces of the formed lens such that the second bar code appears on and stays with that portion of the surfaces of the lens when the lens is removed from the mold.

10. The method of claim 9, the step of placing a first bar code further comprises the step of ink jetting the first bar code onto the back surface of the mold.

11. The method of claim 9, the step of placing an image of a second bar code further comprising the step of ink jetting the image of the second bar code onto the facing inside surface of the mold.

12. The method of claim 9, wherein the lens-forming material comprises a polymerisable thermosetting resin.

13. The method of claim 11, wherein the mold is made from glass and the ink of the image of the second bar code has a stronger affinity to the lens than to the mold.

14. The method of claim 9, further comprising the steps of updating the information at least representing the first bar code; and placing an image of a second bar code containing the updated information on the facing inside surface of the mold.

15. The method of claim 9, wherein the second bar code includes a machine-readable part.

16. The method of claim 15, wherein the second bar code is readable by a scanner.

17. The method of claim 9, wherein the second bar code includes a human-readable part.

18. An apparatus for identifying a lens with a bar code, wherein the lens is formed by molding using a first mold and a second mold whose facing inside surfaces are a negative image of the surfaces of the lens when the molds are positioned at a proper distance and rotational orientation to each other, and the bar code contains information identifying the lens' properties that are determined by the molds including the power of the lens, comprising:
   a. means for placing an image of the bar code on the facing inside surface of the first mold;
   b. means for filling the molds with a lens-forming liquid;
   c. means for curing the lens-forming liquid to form the lens; and
   d. means for transferring the image of the bar code directly from the first mold to a portion of the surfaces of the lens such that the bar code appears on and remains with that portion of the surfaces of the lens when the lens is removed from the molds.

19. An apparatus for identifying a lens for inventory control, comprising:
   a. means for measuring at least one mold to obtain a set of specification identifying its properties;

b. means for placing a first bar code containing information representing the set of specification identifying its properties on the back of surface of a mold;

c. means for placing an image of a second bar code containing the information at least representing the first bar code on the facing inside surface of the mold;

d. means for filling the mold with a lens-forming liquid;

e. means for curing the lens-forming liquid to form the lens; and f. means for transferring the image of the second bar code from the mold to a portion of the surfaces of the lens by virtue of direct contact between the mold and the portion of the surfaces of the formed lens such that the second bar code appears on and stays with that portion of the surfaces of the lens when the lens is removed from the mold.

* * * * *